US011621920B2

(12) United States Patent
Urman et al.

(10) Patent No.: US 11,621,920 B2
(45) Date of Patent: *Apr. 4, 2023

(54) BANDWIDTH-CONTROL POLICERS IN A NETWORK ADAPTER

(71) Applicant: Mellanox Technologies, Ltd., Yokneam (IL)

(72) Inventors: Avi Urman, Yokneam Illit (IL); Lior Narkis, Petah Tikva (IL); Omri Kahalon, Yehud (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/902,834

(22) Filed: Sep. 4, 2022

(65) Prior Publication Data

US 2022/0417157 A1 Dec. 29, 2022

Related U.S. Application Data

(63) Continuation of application No. 17/151,705, filed on Jan. 19, 2021, now Pat. No. 11,470,007.

(51) Int. Cl.
*H04L 47/20* (2022.01)
*H04L 47/2466* (2022.01)
(Continued)

(52) U.S. Cl.
CPC .......... *H04L 47/20* (2013.01); *G06F 9/45558* (2013.01); *H04L 47/12* (2013.01); *H04L 47/2466* (2013.01); *H04L 47/2475* (2013.01); *H04L 47/783* (2013.01); *G06F 2009/45595* (2013.01)

(58) Field of Classification Search
None
See application file for complete search history.

(56) References Cited

U.S. PATENT DOCUMENTS 6,751,663 B1   6/2004  Farrell et al.
7,787,472 B2   8/2010  Washburn et al.
(Continued)

FOREIGN PATENT DOCUMENTS

WO    2020212308 A1   10/2020

OTHER PUBLICATIONS

Heinanen et al., "A Single Rate Three Color Marker," Request for Comments (RFC) 2697, The Internet Society, pp. 1-7, Sep. 1999.
(Continued)

*Primary Examiner* — Scott B Christensen
(74) *Attorney, Agent, or Firm* — Kligler & Associates Patent Attorneys Ltd

(57) ABSTRACT

A network adapter includes a network interface, a host interface and processing circuitry. The network interface is configured to connect to a communication network. The host interface is configured to communicate with a host processor running multiple application programs. The processing circuitry includes one or more bandwidth-control policers, and is configured to receive from the communication network a packet destined to a given application program among the application programs running on the host processor, to associate a bandwidth-control policer with the packet, selected from among the bandwidth-control policers, and to apply the selected bandwidth-control policer to the packet to produce a policer result.

24 Claims, 3 Drawing Sheets

(51) Int. Cl.
    *H04L 47/2475* (2022.01)
    *G06F 9/455* (2018.01)
    *H04L 47/783* (2022.01)
    *H04L 47/12* (2022.01)

(56) References Cited

U.S. PATENT DOCUMENTS

| | | |
|---|---|---|
| 8,045,470 B2 | 10/2011 | Zseby |
| 8,705,365 B1 | 4/2014 | Martin et al. |
| 8,856,518 B2 | 10/2014 | Sridharan et al. |
| 9,331,947 B1 | 5/2016 | O'Keeffe et al. |
| 9,450,881 B2 | 9/2016 | Dumitrescu et al. |
| 9,942,158 B2 | 4/2018 | Shetty et al. |
| 10,181,987 B2 | 1/2019 | Grandham et al. |
| 10,237,354 B2 | 3/2019 | Jani |
| 10,341,263 B2 | 7/2019 | Zou et al. |
| 10,432,745 B2 | 10/2019 | Daly et al. |
| 10,924,418 B1 | 2/2021 | Gudibanda et al. |
| 11,310,163 B1 | 4/2022 | Lo et al. |
| 11,470,007 B2 | 10/2022 | Urman et al. |
| 2004/0081095 A1 | 4/2004 | Liu et al. |
| 2005/0160180 A1 | 7/2005 | Rabje et al. |
| 2006/0221819 A1 | 10/2006 | Padwekar |
| 2009/0109847 A1 | 4/2009 | Stephenson et al. |
| 2010/0150004 A1 | 6/2010 | Duffield et al. |
| 2011/0080886 A1 | 4/2011 | Chandrachood et al. |
| 2012/0054363 A1 | 3/2012 | Hart |
| 2015/0006755 A1 | 1/2015 | Turlington et al. |
| 2015/0085694 A1 | 3/2015 | Agarwal et al. |
| 2016/0262073 A1 | 9/2016 | Muley et al. |
| 2017/0177222 A1 | 6/2017 | Singh et al. |
| 2019/0058641 A1 | 2/2019 | Mirzazad Barijough et al. |
| 2020/0358674 A1 | 11/2020 | Harikrishnan et al. |
| 2021/0084530 A1 | 3/2021 | Song et al. |
| 2021/0117360 A1 | 4/2021 | Kutch et al. |
| 2022/0255870 A1 | 8/2022 | Lo et al. |

OTHER PUBLICATIONS

Heinanen et al., "A Two Rate Three Color Marker," Request for Comments (RFC) 2698, The Internet Society, pp. 1-6, Sep. 1999.

Hahne et al., "Dynamic Queue Length Thresholds for Multiple Loss Priorities," IEEE/ACM Transactions on Networking, vol. 10, No. 3, pp. 368-380, Jun. 2002.

Claise et al., "Specification of the IP Flow Information Export (IPFIX) Protocol for the Exchange of Flow Information," Request for Comments (RFC) 7011, Internet Engineering Task Force (IETF), pp. 1-77, Sep. 2013.

U.S. Appl. No. 17/687,642 Office Action dated Oct. 5, 2022.

BANDWIDTH-CONTROL POLICERS IN A NETWORK ADAPTER

CROSS-REFERENCE TO RELATED APPLICATION

This application is a continuation of U.S. patent application Ser. No. 17/151,705, filed Jan. 19, 2021, whose disclosure is incorporated herein by reference.

TECHNICAL FIELD

Embodiments described herein relate generally to data communication, and particularly to methods and systems for offloading bandwidth-control policers to a network adapter.

BACKGROUND

A bandwidth-control policer may be used for forcing a packet stream to meet various bandwidth-related requirements such as, data rate and burst size. Various bandwidth-control policers are known in the art. For example, a Request For Comments (RFC) 2697, entitled "A Single Rate Three Color Marker," September 1999, describes a Single Rate Three Color Marker (srTCM), which meters a traffic stream and marks its packets according to three traffic parameters, Committed Information Rate (CIR), Committed Burst Size (CBS), and Excess Burst Size (EBS), to be either green, yellow, or red. A packet is marked green if it doesn't exceed the CBS, yellow if it does exceed the CBS, but not the EBS, and red otherwise.

As another example, a RFC 2698 entitled "A Two Rate Three Color Marker," September 1999, describes a Two Rate Three Color Marker (trTCM), which meters an IP packet stream and marks its packets based on two rates, Peak Information Rate (PIR) and Committed Information Rate (CIR), and their associated burst sizes to be either green, yellow, or red. A packet is marked red if it exceeds the PIR. Otherwise, it is marked either yellow or green depending on whether it exceeds or doesn't exceed the CIR.

SUMMARY

An embodiment that is described herein provides a network adapter that includes a network interface, a host interface and processing circuitry. The network interface is configured to connect to a communication network. The host interface is configured to communicate with a host processor running multiple application programs. The processing circuitry includes one or more bandwidth-control policers, and is configured to receive from the communication network a packet destined to a given application program among the application programs running on the host processor, to associate a bandwidth-control policer with the packet, selected from among the bandwidth-control policers, and to apply the selected bandwidth-control policer to the packet to produce a policer result.

In some embodiments, the processing circuitry is configured to apply to the packet a given action based on the policer result. In other embodiments, the given action is selected from a list of actions including: marking the packet, dropping the packet, forwarding the packet, mirroring the packet, counting the packet for metering, and proceeding to another match-action table. In yet other embodiments, the processing circuitry is configured to associate the bandwidth-control policer in response to matching the packet to an action in a match-action table.

In an embodiment, the processing circuitry is configured to match the packet, in a match-action table associated with the packet, to an action that specifies a forwarding scheme for sending the packet to the given application program, and to forward the packet to the given application program based on the forwarding scheme. In another embodiment, the processing circuitry is configured to match the packet in a first match-action table to a first action, to apply the first action to the packet, to match the packet in a second match-action table to a second action, and to apply the second action to the packet. In yet another embodiment, the processing circuitry is configured to associate with the packet another different bandwidth-control policer selected from among the bandwidth-control policers, and to apply the another bandwidth-control policer to the packet to produce another policer result.

In some embodiments, the processing circuitry is configured to retrieve a policer context associated with the packet from a memory accessible by the processing circuitry, and to apply the selected bandwidth-control policer to the packet using the policer context. In other embodiments, the given application program is selected from a list of application programs including: a Virtual Machine (VM), a hypervisor controlling one or more VMs, a Virtual Network Function (VNF), a container, and a non-virtualized application program, and the processing circuitry is configured to apply the selected bandwidth-control policer on behalf of the given application program. In yet other embodiments, the processing circuitry is configured to associate the bandwidth-control policer with the packet independently from association of packets destined to other application programs with respective bandwidth-control policers.

There is additionally provided, in accordance with an embodiment that is described herein, a method, including, in a network adapter that includes one or more bandwidth-control policers, the network adapter connects to a communication network and to a host comprising a host processor that runs multiple application programs, receiving from the communication network a packet destined to a given application program among the application programs running on the host processor. A bandwidth-control policer selected from among the bandwidth-control policers is associated with the packet. The selected bandwidth-control policer is applied to the packet to produce a policer result.

There is additionally provided, in accordance with an embodiment that is described herein, a network adapter that includes a network interface, a host interface and processing circuitry. The network interface is configured to connect to a communication network. The host interface is configured to communicate with a host processor running multiple application programs. The processing circuitry includes one or more bandwidth-control policers, and is configured to receive, from an application program among the application programs running on the host processor, an outbound packet destined to a target, to associate a bandwidth-control policer with the outbound packet, selected from among the bandwidth-control policers, to apply the selected bandwidth-control policer to the outbound packet to produce a policer result, and based on the policer result, apply a given action to the outbound packet.

There is additionally provided, in accordance with an embodiment that is described herein, a method, including, in a network adapter that includes one or more bandwidth-control policers, the network adapter connects to a communication network and to a host including a host processor that runs multiple application programs, receiving from an application program among the application programs running on the host processor, an outbound packet destined to a target. A bandwidth-control policer selected from among the bandwidth-control policers is associated with the outbound packet. The selected bandwidth-control policer is applied to the outbound packet to produce a policer result. Based on the policer result, a given action is applied to the outbound packet.

These and other embodiments will be more fully understood from the following detailed description of the embodiments thereof, taken together with the drawings in which:

DETAILED DESCRIPTION OF EMBODIMENTS

Overview

Figure 1:
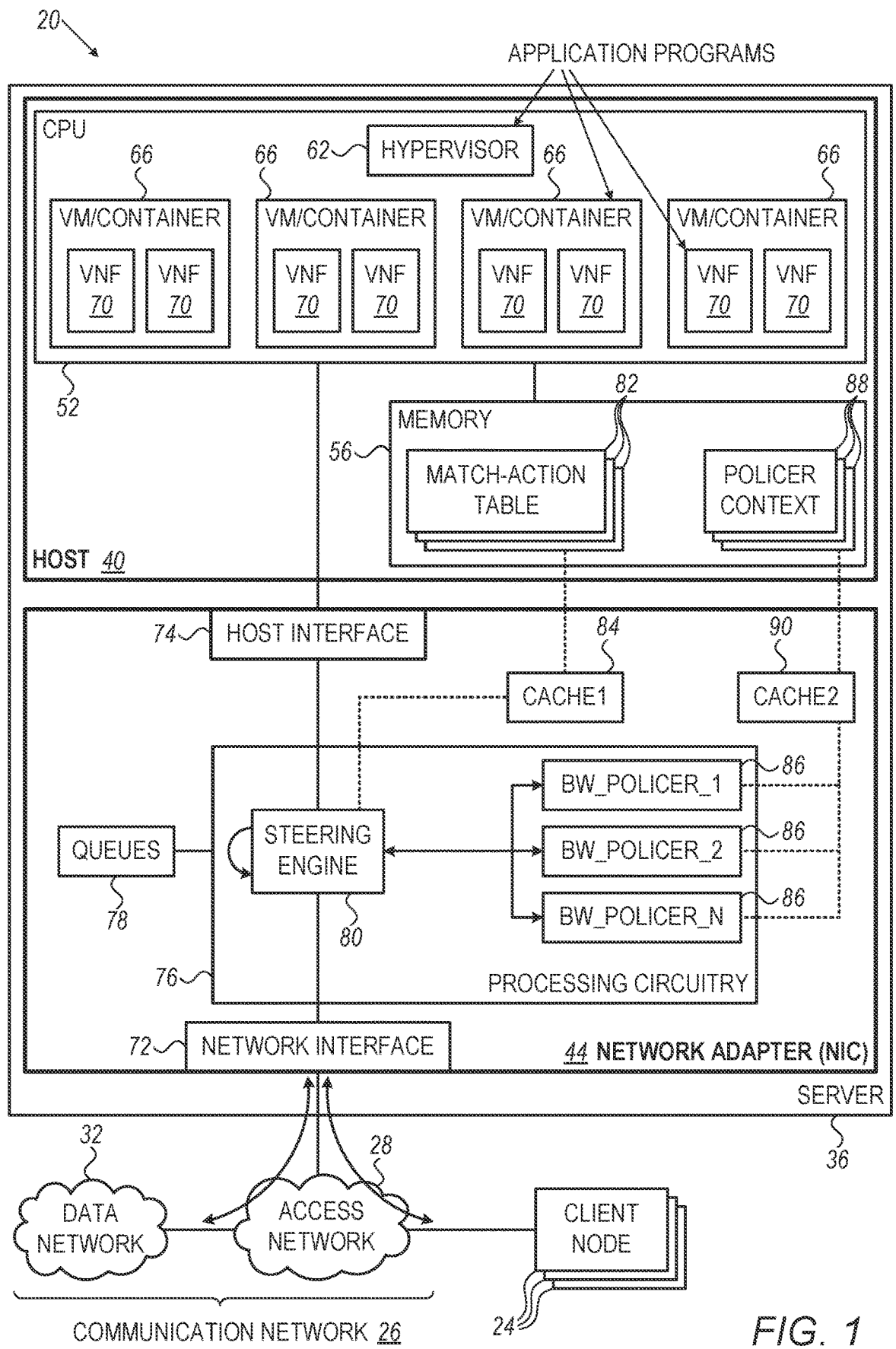
FIG. 1 is a block diagram that schematically illustrates a communication system in which bandwidth-control policers are implemented in a network adapter, in accordance with an embodiment that is described herein.

Embodiments that are described herein provide methods and systems for applying bandwidth-control policing in a network adapter.

In various applications, a service provider, or an operator monitors and controls packet streams, e.g., to enforce policies agreed with end users. Various types of policies may be used including limiting bandwidth-related parameters and quota that end users may consume. For each user the operator needs to enforce policies as agreed with that user. Moreover, different policies may be applied, for example, to packets that are received and transmitted by the same end user. For example, an end user may be entitled to different data rates in consuming and in uploading video content.

In some applications, dedicated servers are used for metering and controlling traffic communicated with end users. Such servers are referred to herein as "user-plane servers," and may connect to an access network via which end users gain access to a data network such as the Internet. A user-plane server typically connects to the access network using a network adapter, e.g., a Network Interface Controller (NIC).

As one example, in certain cellular networks, a user-plane server that provides User Plane Function (UPF) functionality connects to a Radio Access Network (RAN) to which mobile users connect. As another example, in application for providing high-speed data services such as cable Internet and Voice Over Internet Protocol (VoIP), a user-plane server may connect to a Cable Modem Termination System (CMTS) to which the cable subscribers connect using cable modems. The functionality of a user-plane sever may include bandwidth-control policing, among other policies and functions.

A user-plane server may run application programs for enforcing various policies to packet streams communicated with end users. The application programs may comprise any suitable type of a software program such as, for example, a Virtual Machine (VM), a Virtual Network Function (VNF), a hypervisor that controls multiple VMs, a container and the like. In principle, each of the application programs may include one or more bandwidth-control policers that are implemented in software. Such software-based policing, however, degrades performance and consumes computing resources. As such, software-based policing consumes considerable processing power (e.g., CPU cycles) that could be used for other purposes. Moreover, software-based bandwidth-control policing is poorly scalable, and increasing the scale typically degrades the performance.

In the disclosed embodiments, bandwidth-control policers are implemented in the network adapter via which the user-plane server connects to the access network. The network adapter comprises multiple bandwidth-control policers that may be applied flexibly to packets exchanged between end users and a data network. The network adapter may apply bandwidth-control policing to packets originating by client nodes and destined to the data network, and to packets originating in the data network and destined to client nodes.

Consider a network adapter comprising a network interface, a host interface and processing circuitry. The network interface connects to a communication network (e.g., an access network of an operator). The host interface communicates with a host processor running multiple application programs. The processing circuitry comprising one or more bandwidth-control policers and is configured to receive from the communication network a packet destined to a given application program among the application programs running on the host processor, to associate a bandwidth-control policer with the packet, selected from among the bandwidth-control policers, and to apply the selected bandwidth-control policer to the packet to produce a policer result. Based on the policer result, the processing circuitry may apply to the packet a given action, e.g., marking the packet, dropping the packet, forwarding the packet, mirroring the packet, and counting the packet for metering.

In some embodiments, the processing circuitry associates the bandwidth-control policer in response to matching the packet to an action in a match-action table. In some embodiments, to forward the packet, the processing circuitry matches the packet in a match-action table associated with the packet, to an action that specifies a forwarding scheme for sending the packet to the given application program, and forwards the packet to the given application program based on the forwarding scheme.

In some embodiments, the processing circuitry supports applying multiple actions to the same packet. In such embodiments, the processing circuitry matches the packet in a first match-action table to a first action, applies the first action to the packet, matches the packet in a second match-action table to a second action, and applies the second action to the packet.

The processing circuitry may apply to the same packet two or more bandwidth-control policers. For example, the processing circuitry associates with the packet another different bandwidth-control policer selected from among the bandwidth-control policers, and applies the another bandwidth-control policer to the packet to produce another policer result.

In some embodiments, to apply the bandwidth-control policer, the processing circuitry retrieves a policer context associated with the packet from a memory accessible by the processing circuitry and applies the selected bandwidth-control policer to the packet using the policer context. The policer context comprises, for example, a policer configuration and a policer state.

In some embodiments, each application program has its own bandwidth-control policing scheme, which is independent from bandwidth-control policing scheme used by other application programs. In an embodiment, the processing circuitry associates the bandwidth-control policer with the packet independently from association of packets destined to other application programs with respective bandwidth-control policers.

In some embodiments, bandwidth-control policing may be applied to packets sent by application programs running on the host. In such embodiments, the processing circuitry is configured to receive from an application program among the application programs running on the host processor, an outbound packet destined to a target, to associate bandwidth-control policer with the outbound packet, selected from among the bandwidth-control policers, to apply the selected bandwidth-control policer to the outbound packet to produce a policer result. Based on the policer result, the processing circuitry may apply a given action to the outbound packet.

In the disclosed techniques a network adapter comprises a pool of bandwidth-control policers that may be applied to packet streams on behalf of application programs running on a host. The application programs may run in a virtual environment and implemented, e.g., as VMs and VNFs, or alternatively run as non-virtualized application programs. This architecture provides flexible user-plane control of the packet streams, for enforcing operator requirements such as limiting data rate, burst size and/or quota. Offloading the bandwidth-control policers to the network adapter reduces host processing overhead and results in scalability that cannot be achieved using software-based policing.

System Description

FIG. 1 is a block diagram that schematically illustrates a communication system 20 in which bandwidth-control policers are implemented in a network adapter, in accordance with an embodiment that is described herein.

In the example of communication system 20, a communication network 26 comprises an access network 28 via which the client nodes gain access to a data network 32. The access network may comprise any suitable type of an access network, operating using any suitable communication protocols. For example, in some embodiments, client nodes 24 comprise mobile nodes, and access network 28 comprises a suitable Radio Access Network (RAN) operating in accordance with relevant cellular network protocols. In this case, client nodes 24 connect to the access network using suitable over the air protocols. In other embodiments, client nodes 24 comprise cable subscribers, in which case access network 28 comprises a Cable Modem Termination System (CMTS) to which the client nodes connect using cable modems (not shown).

Data network 32 may comprise any suitable data network, e.g., the Internet. Client nodes 24 communicate with data network 32, e.g., for receiving various data services, e.g., browsing and/or data streaming over the Internet.

Communication system 20 comprises a server 36 that enforces various policies agreed between the operator and the end users of the client nodes. Server 36 processes packets received from the data network and forwards at least some of the received packets to the relevant client nodes. Server 36 further receives packets sent by client nodes to destinations in the data network, process the received packets, and forwards at least some of the received packets to their destinations in the data network.

Server 36 is also referred to herein as a "user-plane" server, which may belong to a cloud of multiple user-plane servers.

Server 36 comprises a host processor 40 coupled to a network adapter 44 via any suitable link or bus 48, e.g., a Peripheral Component Interconnect Express (PCIe) bus. Host processor 40 connects to access network 28 using network adapter 44 that supports enforcing bandwidth-control policing on packet streams communicated between client nodes 24 and data network 32, as will be described below.

Host processor 40 comprises a CPU 52 and a memory 56. In the present example, CPU 52 runs multiple application programs in a virtualized environment. In this example, CPU 52 runs a hypervisor application that manages a control plane for multiple Virtual Machines (VMs) 66, each of which may run one or more Virtual Network Functions (VNFs) 70. Alternatively, instead of or in addition to VMs, CPU 52 may run multiple containers controlled by another control plane of hypervisor 62 or within VMs 66. In the description that follows a VNF 70 may alternatively refer to a container. Note that using virtualized application programs is not mandatory. In alternative embodiments, non-virtualized application programs can also be used.

In some embodiments, CPU 52 in host processor 40 comprises multiple processing cores (not shown), wherein each core may run multiple VMs 66 running multiple VNFs (or containers) 70. In such embodiments, hypervisor 62 may manage multiple VMs on multiple cores. Alternatively, each processing core runs a hypervisor that manages the VMs on that core.

In some embodiments, VNF 70 may implement a function that manages user plane functionality. For example, for mobile client nodes, VNF 70 may implement a User Plane Function (UPF), which is related to the 3GPP 5G Architecture. The UPF is similar to the Serving/Packet Gateway in a 4G LTE system. The UPF supports features and capabilities to facilitate user plane operation, such as packet routing and forwarding, interconnection to the data network (32), policy enforcement and data buffering.

VNF 70 may similarly manage user plane functionality in other types of communication networks such as in other cellular networks or in cable-based networks, for example. As will be described in detail below, an application program running on CPU 52, such as VNF (or container) 70, VM 66 and hypervisor 62 may enforce bandwidth-control policies using bandwidth-control policers implemented in network adapter 44. In the present context and in the claims, the term "application program" refers to any software program running on a processor of the host, such as hypervisor 62, VM (or container) 66, VNF 70 and/or a non-virtualized application program.

Network adapter 44 comprises a network interface 72 for connecting to communication network 26 (e.g., to access network 28), and a host interface 74 for connecting to host processor 40. Processing circuitry 76 coupled between the network interface and the host interface, processes packets received from and destined to communication network 26. Packets received from the communication network and packets pending transmission back to the communication network are stored in queues 78.

Processing circuitry 76 comprises a processing pipeline also referred to as a steering engine 80, which is configured to process packets exchanged with the communication network and to direct the packets to their respective destinations. The operation of directing a packet typically includes determining a required destination of the packet and forwarding the packet to its destination.

In some embodiments, steering engine 80 applies one or more actions to a packet, wherein the last action may comprise forwarding the packet to its destination. Steering engine 80 directs incoming packets to the application programs to which they are destined, and directs packets sent by the application programs to their target destinations, e.g., among the client nodes or in data network 32. The functionality of exchanging packets between steering engine 80 and virtual application programs running on the host is similar to the functionality of a virtual switch typically implemented in software. The software virtual switch is thus offloaded to the network adapter, meaning that the implementation within the network adapter replaces the functionality of the software virtual switch. For this purpose, virtual application programs may be assigned MAC addresses or any other suitable addressing identifiers.

In some embodiments, steering engine 80 processes packets using match-action tables 82 stored in memory 56 of the host. In an embodiment, some of the match-action tables are cached in a local cache 84, denoted CACHE1 in the figure, for reducing latency and enhancing performance. In some embodiments, each match-action table comprises multiple steering entries with each steering entry including an index and a respective steering action entry. The steering action entry may comprise any suitable action to be taken for the packet. The steering action entry may specify, for example, a queue in which the packet should be queued, a destination to which to send the packet, a modification to apply to the packet header, a destination for mirroring the packet, a bandwidth-control policer to apply to the packet, and/or a next match-action table to use as part of the steering process.

The steering action entry may indicate which header part (or header parts) of the packet should be used and how this header part should be processed for lookup in the next match-action table. In this manner processing may pass from one match-action table to another. Lookup in each match-action table may be carried out, for example, by applying a suitable hash function to one or more headers of the packet to produce an index value. Alternatively, any other suitable lookup method can also be used.

In some embodiments, network adapter 44 comprises bandwidth-control policers 86 implemented in hardware (or in combination of hardware and software). Bandwidth-control policers 86 may be of one or more policer types, i.e., implementing a single policy scheme or multiple different policing schemes. For example, some of bandwidth-control policers 86 in the network adapter may be implemented in accordance with the policer scheme specified in RFC 2697 cited above, whereas other bandwidth-control policers 86 may implement the policer scheme specified in RFC 2698 cited above. Bandwidth-control policers implementing other suitable bandwidth-control policing schemes can also be used.

In the present context and in the claims, the term "bandwidth-control policer" refers to a device configured to monitor data (e.g., in packets of a packet stream), and to produce a policer result related to the amount of data monitored over time or to a total amount of data monitored (e.g., quota). In some embodiments, bandwidth-control policer 86 is preconfigured with policy constraints such as a maximal bandwidth and a maximal burst size. In some embodiments, bandwidth-control policer 86 further comprises a state, e.g., in the form of filling status of one or more token buckets. In some embodiments, bandwidth-control policer 86 can be configured to control data rate (e.g., amount of data per time unit) or packet rate (e.g., the number of packets per time unit).

In some embodiments, bandwidth-control policer 86 can be used for applying a quota limitation policy using appropriate configuration. For example, when bandwidth-control policer 86 is implemented in accordance with RFC 2697 or RFC 2698 cited above, a token count in the policer state is initialized to the desired quota value, and incrementation of the token count is configured to be disabled. As packets are monitored, their sizes are consumed from the token count, and when the entire quota is consumed the policer result turns to a color red to signal the event.

In some embodiments, an application program (e.g., Hypervisor 62, VM 66, and VNF 70) is assigned to processes one or more packet streams. In such embodiments, memory 56 of the host stores for each of the application programs one or more policer contexts, e.g., a policer context for each of the packet streams. In some embodiments, the network adapter isolates among memory regions used by different applications so that different applications may have different namespaces. The policer context comprises the required policer configuration and a policer state. In some embodiments, to reduce latency, some of the policer contexts are cached locally in a cache 90 denoted CACHE2 in the figure. Methods for applying bandwidth-control policer in the network adapter will be described in detail below.

The configurations of communication network 26, server 36 and network adapter 44 are example configurations, which are chosen purely for the sake of conceptual clarity. In alternative embodiments, any other suitable communication network, server, and network adapter configurations can also be used. Elements that are not necessary for understanding the principles of the present invention, such as various interfaces, addressing circuits, timing and sequencing circuits and debugging circuits, have been omitted from the figure for clarity.

Some elements of network adapter 44 such as processing circuitry 76, and bandwidth-control policers 86 may be implemented in hardware, e.g., in one or more Application-Specific Integrated Circuits (ASICs) or FPGAs. Additionally or alternatively, processing circuitry 76 and bandwidth-control policers 86 can be implemented using software, or using a combination of hardware and software elements. Memory 56 may comprise any suitable storage element such as, for example, a Random-Access Memory (RAM), a Nonvolatile (NVM) memory such as a Flash memory device. In some embodiments, memory 56 comprises multiple storage elements of various storage types.

In some embodiments, some of the functions of network adapter 44 may be carried out by a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Applying Bandwidth-Control Policies in a Network Adapter

To apply a bandwidth-control policy on behalf of an application program for a given packet stream, steering engine 80 selects an available bandwidth-control policer 86 (implementing the required policer scheme), loads the relevant policer context from memory 56 (or uses the policer context in CACHE2 if available), and executes the selected bandwidth-control policer using the policer context to produce a policer result. The steering engine may use the policer result in selecting a subsequent steering action entry in the current or another match-action table.

Bandwidth-control policers 86 and policer contexts 88 may be selected in various ways. For example, multiple match-action tables may be configured to select bandwidth-control policers 86 having different respective policing schemes. Alternatively or additionally, multiple match-action tables may select a common physical bandwidth-control policer 86, or multiple bandwidth-control policers 86 implementing the same policing scheme. In some embodiments, a common bandwidth-control policer 86 may be shared among multiple different packet streams (using one or more different policer contexts). Alternatively or additionally, a packet processed by the steering engine may be subjected to multiple different bandwidth-control policers of different policing schemes.

In some embodiments, different application programs running on host processor 40 are assigned dedicated respective domains within memory 56 for storing policer contexts. In this configuration, bandwidth-control policing schemes that are used on behalf of different application programs are isolated from one another.

Using a pool of bandwidth-control policers in the network adapter, wherein the bandwidth-control policers are executed using retrieved policer contexts, provides high flexibility and scalability in applying bandwidth-control policing.

Figure 2:
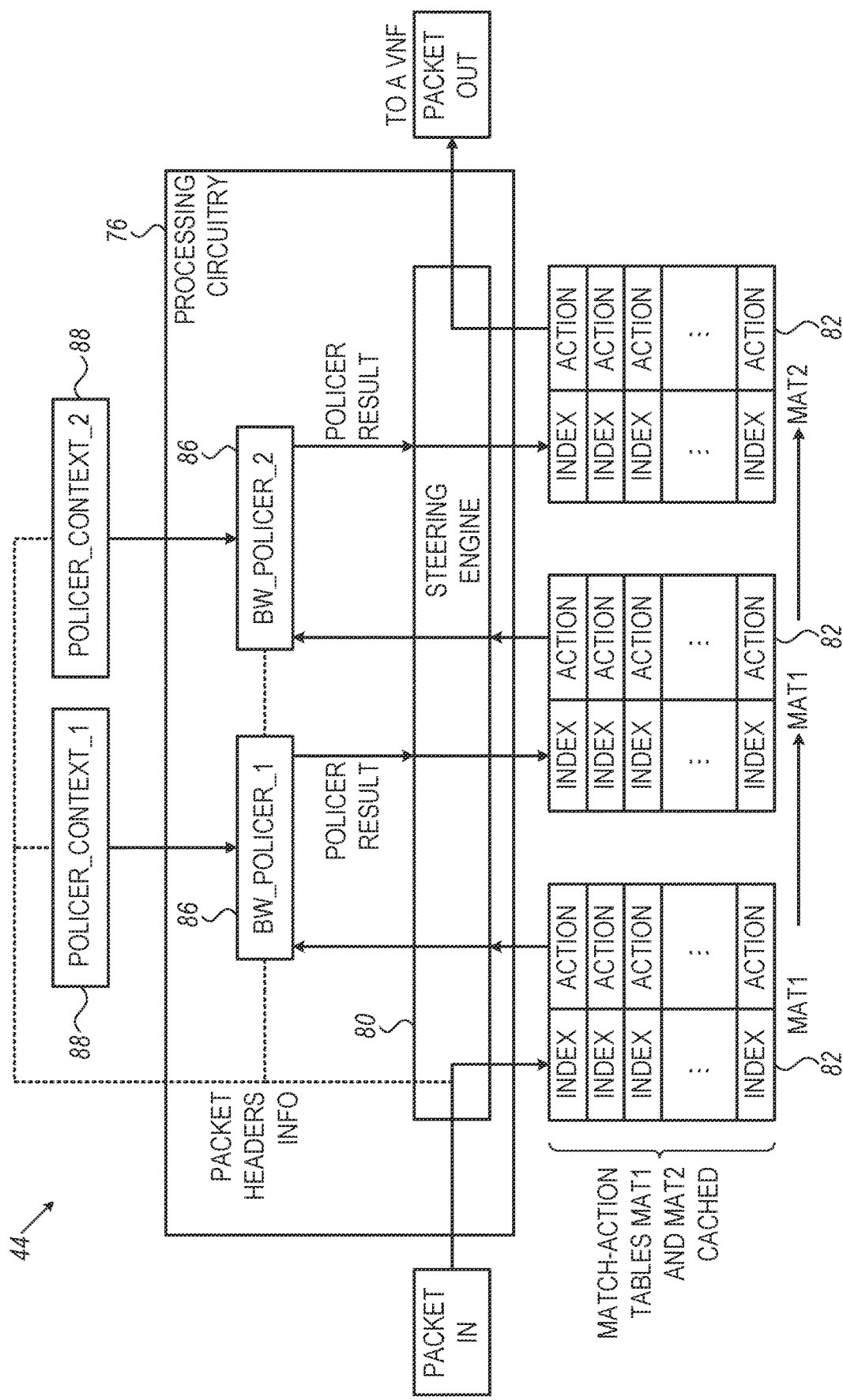
FIG. 2 is a diagram that schematically illustrates a processing flow in which two bandwidth-control policers are applied to a given packet.

FIG. 2 is a diagram that schematically illustrates a processing flow in which two bandwidth-control policers are applied to a given packet.

In FIG. 2, a packet is processed by steering engine 80 of network adapter 44 using match-action tables 82 denoted MAT1 and MAT2. In some embodiments, steering engine 80 calculates, based on a header of the packet, a corresponding index in MAT1. In the present example, the matching action comprises applying to the packet a bandwidth-control policer 86 denoted BW_POLICER_1. Based on information in the packet's header(s), the steering engine selects a relevant policer context 88 denoted POLICER_CONTEXT_1 in memory 56 (or in CACHE2 90) corresponding to the packet stream to which the packet belongs. The steering engine applies to the packet the policer scheme of BW_POLICER_1 using the selected policer context, to produce a policer result.

In the present example, the steering engine looks up the policer result produced by BW_POLICER_1 in the same match-action table MAT1, which results in an action to apply to the packet another policer denoted BW_POLICER_2.

The steering engine selects for the packet another policer context 88 denoted POLICER_CONTEXT_2, and applies BW_POLICER_2 to the packet using POLICER_CONTEXT_2 to produce another policer result. The steering engine may select different policer contexts to the same packet using different header parts of the packet.

In the present example, the steering engine looks up the policer result of the BW_POLICER_2 in MAT2 and possibly also based on the packet header(s), matches a corresponding action in MAT2 that specifies to forward the packet to a certain VNF 70 running on the host. Consequently, the steering engine forwards the packet to the relevant VNF via host interface 74.

Cascading of bandwidth-control policers can be used, for example, in a UPF application. In this case, a mobile user may be assigned three bandwidth-control policers, a bandwidth-control policer for a session, another bandwidth-control policer for a selected service (e.g., a video or voice call) and yet another bandwidth-control policer for Quality of Service (QoS).

A Method for Bandwidth-Control Policing in a Network Adapter

Figure 3:
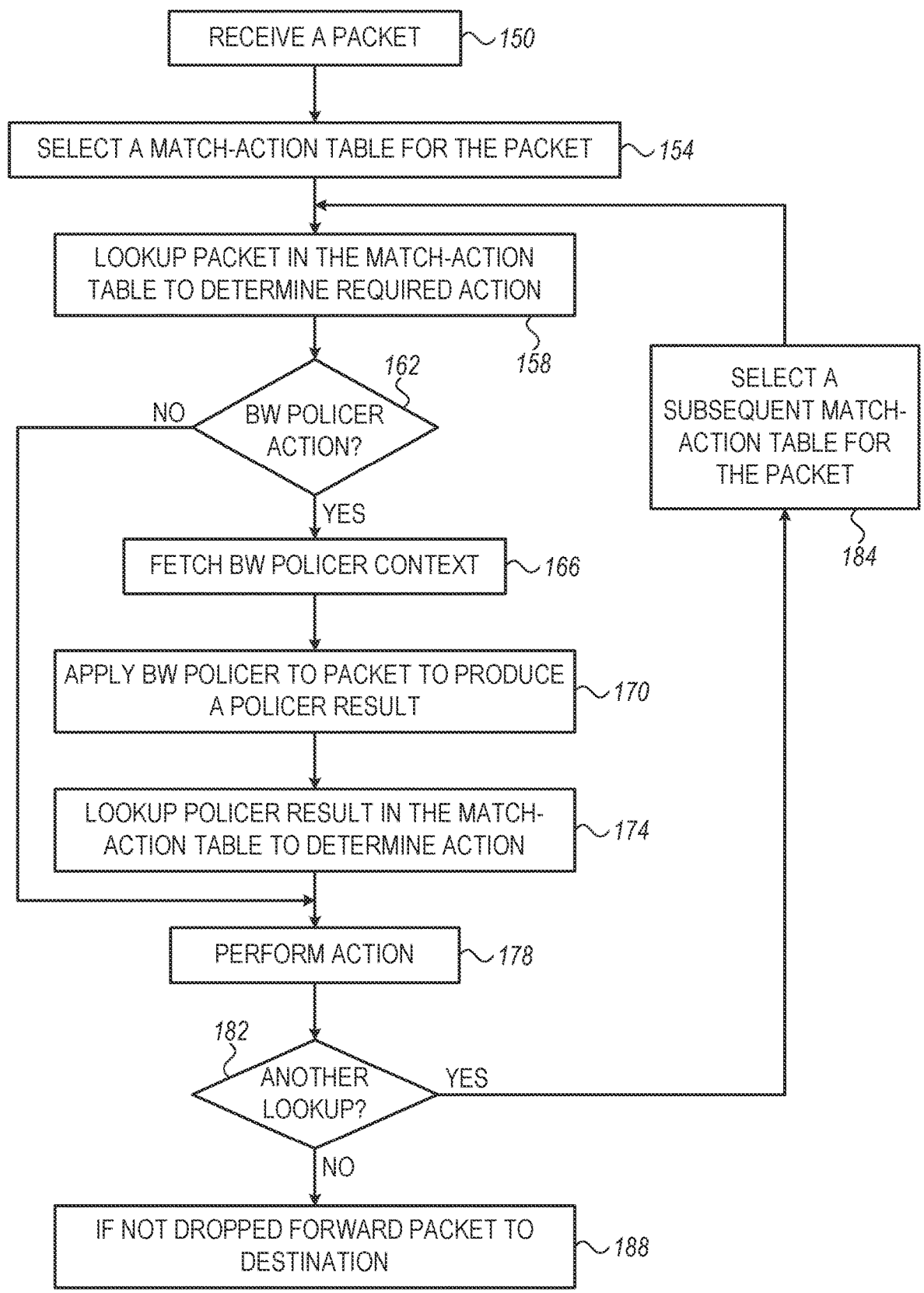
FIG. 3 is a flow chart that schematically illustrates a method for bandwidth-control policing in a network adapter, in accordance with an embodiment that is described herein.

FIG. 3 is a flow chart that schematically illustrates a method for bandwidth-control policing in a network adapter, in accordance with an embodiment that is described herein.

The method will be described as executed by processing circuitry 76 of network adapter 44 of FIG. 1. The method is described for packets received from access network 28 and delivered to application programs running on the host.

The method begins with processing circuitry 76 receiving a packet from access network 28 via network interface 72, at a reception step 150. At a match-action table selection step 154, the processing circuitry selects for the packet a match-action table, and at a matching step 158, the processing circuitry looks up an action in the selected match-action table.

At an action query step 162, the processing circuitry checks whether the matching action in the match-action table specifies applying to the packet a bandwidth-control policer or another type of policer. When the action at step 162 specifies a given bandwidth-control policer, the processing circuitry proceeds to a context selection step 166, at which the processing circuitry fetches from memory 56 (or CACHE2) a relevant policer context 88. Otherwise, the method proceeds to step 178 that will be described below.

At a policer application step 170, the processing circuitry applies the given bandwidth-control policer to the packet using the fetched policer context, to produce a policer result. The policer result may comprise, for example, a color indication such as green, yellow or red. Alternatively, any other policer result coding can also be used. At a policer result lookup step 174, the processing circuitry looks up the policer result in the match-action table to determine a subsequent action, e.g., marking the packet, dropping the packet, forwarding the packet, mirroring the packet, counting the packet for metering, or proceeding to another match-action table.

At an action execution step 178, the processing circuitry applies to the packet the action of step 174, or a non-policer action following a negative result at step 162 above. At a lookup query step 182, the processing circuitry checks whether another lookup is required, e.g., by the action of step 178 or following the action of step 178. When another lookup is required for the packet, the processing circuitry selects a subsequent match-action table at a next match-action table selection step 184 and loops back to step 158 to perform the lookup operation. Otherwise, the processing circuitry proceeds to forward the packet to its destination at a forwarding step 188, assuming the packet was not dropped, e.g., due to applications of one or more bandwidth-control policers. Following step 188 the method terminates.

The method of FIG. 3 was described for packets received from the access network. The method is, however, similarly applicable to packets received from application programs running on the host and that are destined to respective targets, e.g., via the access network.

The embodiments described above are given by way of example, and other suitable embodiments can also be used. For example, although the embodiments described above refer mainly to bandwidth-control policers in a user-plane server operating in-between client nodes and a data network, the disclosed embodiments are similarly applicable to network nodes comprising end nodes in a communication network.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network adapter of a host in a system that includes client nodes, the network adapter comprising:
    a network interface configured to be connected to a network;
    a host interface configured to communicate with a host processor of the host, the host processor running multiple application programs that enforce bandwidth-control policies on packets communicated between the client nodes and target nodes in the network; and
    processing circuitry comprising one or more bandwidth-control policers that are configured to apply the bandwidth-control policies specified by each of the multiple application programs, wherein each application program is configured to separately specify a bandwidth-control policer of the one or more bandwidth-control policers, the processing circuitry configured to:
    receive from the network, via the network interface, a packet that
        (i) is communicated between one of the client nodes and a target node in the network, and
        (ii) is subject to a given bandwidth-control policy enforced by a given application program of the multiple application programs;
    select, based on the packet, a bandwidth-control policer supporting the given bandwidth-control policy from among the bandwidth-control policers comprised in the network adapter;
    apply the given bandwidth-control policy to the packet, as specified by the given application program, using the selected bandwidth-control policer, to produce a policer result; and
    further process the packet based at least on the policer result, including at least selectively forwarding the packet.

2. The network adapter according to claim 1, wherein, in further processing the packet, the processing circuitry is configured to apply to the packet a given action based on the policer result.

3. The network adapter according to claim 2, wherein the given action is selected from a list of actions comprising: marking the packet, dropping the packet, mirroring the packet, counting the packet for metering, and proceeding to another match-action table.

4. The network adapter according to claim 1, wherein the processing circuitry is configured to associate the packet with the selected bandwidth-control policer in response to matching the packet to an action in a match-action table.

5. The network adapter according to claim 1, wherein the processing circuitry is configured to match the packet, in a match-action table associated with the packet, to an action that specifies a forwarding scheme for sending the packet to the given application program, and to forward the packet to the given application program based on the forwarding scheme.

6. The network adapter according to claim 1, wherein the processing circuitry is configured to match the packet in a first match-action table to a first action, to apply the first action to the packet, to further match the packet in a second match-action table to a second action, and to apply the second action to the packet.

7. The network adapter according to claim 1, wherein the processing circuitry is configured to associate with the packet another different bandwidth-control policer selected from among the bandwidth-control policers comprised in the network adapter, and to apply to the packet a bandwidth-control policy supported by the another bandwidth-control policer to produce another policer result.

8. The network adapter according to claim 1, wherein the processing circuitry is configured to retrieve a policer context associated with the packet from a memory accessible by the processing circuitry, and to apply the given bandwidth-control policy to the packet using the policer context.

9. The network adapter according to claim 1, wherein the given application program is selected from a list of application programs comprising: a Virtual Machine (VM), a hypervisor controlling one or more VMs, a Virtual Network Function (VNF), a container, and a non-virtualized application program.

10. The network adapter according to claim 1, wherein the processing circuitry is configured to associate the bandwidth-control policer with the packet independently from association of packets destined to other application programs with respective bandwidth-control policers.

11. A method, comprising:
    in a network adapter of a host in a system that includes client nodes, wherein the network adapter is connected to a network and to a host comprising a host processor that runs multiple application programs that enforce bandwidth-control policies on packets communicated between the client nodes and target nodes in the network, wherein the network adapter comprises one or more bandwidth-control policers that are configured to apply the bandwidth-control policies specified by each of the multiple application programs, wherein each application program is configured to separately specify a bandwidth-control policer of the one or more bandwidth-control policers,
    receiving from the network a packet that
        (i) is communicated between one of the client nodes and a target node in the network, and
        (ii) is subject to a given bandwidth-control policy enforced by a given application program of the multiple application programs;
    selecting, based on the packet, a bandwidth-control policer supporting the given bandwidth-control policy from among the bandwidth-control policers comprised in the network adapter;
    applying the given bandwidth-control policy to the packet, as specified by the given application program, using the selected bandwidth-control policer, to produce a policer result; and
    further processing the packet based at least on the policer result, including at least selectively forwarding the packet.

12. The method according to claim 11, wherein further processing the packet comprises applying to the packet a given action based on the policer result.

13. The method according to claim 12, wherein the given action is selected from a list of actions comprising: marking the packet, dropping the packet, mirroring the packet, counting the packet for metering, and proceeding to another match-action table.

14. The method according to claim 11, and comprising associating the packet with the selected bandwidth-control policer in response to matching the packet to an action in a match-action table.

15. The method according to claim 11, and comprising matching the packet in a match-action table associated with the packet, to an action that specifies a forwarding scheme for sending the packet to the given application program, and forwarding the packet to the given application program based on the forwarding scheme.

16. The method according to claim 11, and comprising, matching the packet in a first match-action table to a first action, applying the first action to the packet, further matching the packet in a second match-action table to a second action, and applying the second action to the packet.

17. The method according to claim 11, and comprising associating with the packet another different bandwidth-control policer selected from among the bandwidth-control policers comprised in the network adapter, and applying to the packet a bandwidth-control policy supported by the another bandwidth-control policer to produce another policer result.

18. The method according to claim 11, and comprising retrieving a policer context associated with the packet from a memory accessible by the processing circuitry, and applying the given bandwidth-control policy to the packet using the policer context.

19. The method according to claim 11, wherein the given application program is selected from a list of application programs comprising: a Virtual Machine (VM), a hypervisor controlling one or more VMs, a Virtual Network Function (VNF), a container, and a non-virtualized application program.

20. The method according to claim 11, and comprising associating the bandwidth-control policer with the packet independently from association of packets destined to other application programs with respective bandwidth-control policers.

21. A network adapter of a host in a system that includes client nodes, the network adapter comprising:

a network interface configured to be connected to a network;

a host interface configured to communicate with a host processor of the host, the host processor running multiple application programs that enforce bandwidth-control policies on packets communicated between the client nodes and target nodes in the network; and processing circuitry comprising one or more bandwidth-control policers that are configured to apply the bandwidth-control policies specified by the multiple application programs, the processing circuitry configured to:

receive from the network, via the network interface, a packet that (i) is communicated between one of the client nodes and a target node in the network, and (ii) is subject to a given bandwidth-control policy enforced by a given application program of the multiple application programs;

select, based on the packet, a bandwidth-control policer supporting the given bandwidth-control policy from among the bandwidth-control policers comprised in the network adapter; and apply the given bandwidth-control policy to the packet, as specified by the given application program, using the selected bandwidth-control policer.

22. The network adapter according to claim 21, wherein the processing circuitry is configured to apply to the packet a given action based on a result of the given bandwidth-control policy.

23. The network adapter according to claim 22, wherein the given action is selected from a list of actions comprising: marking the packet, dropping the packet, forwarding the packet, mirroring the packet, counting the packet for metering, and proceeding to another match-action table.

24. The network adapter according to claim 21, wherein the processing circuitry is configured to select the bandwidth-control policer by matching the packet to an action in a match-action table.

* * * * *